United States Patent

[11] 3,617,892

[72] Inventors James J. Hawley; Francis H. Taylor, both of Cranbury, N.J.

[21] Appl. No. 618,836
[22] Filed Feb. 27, 1967
[45] Patented Nov. 2, 1971
[73] Assignee RCA Corporation

[54] FREQUENCY MODULATION SYSTEM FOR SPREADING RADIATED POWER

7 Claims, 9 Drawing Figs.

[52] U.S. Cl. .......... 325/145, 325/4, 325/7, 325/47, 325/139
[51] Int. Cl. .......... H04b 1/02, H04b 7/20
[50] Field of Search .......... 325/145, 138, 45, 46, 47, 48, 49, 61, 126, 4, 7, 155 AT, 131, 132, 35, 33, 34, 40, 139; 328/156, 158; 307/228; 179/15 FS, 15 BW, 15.55, 1.5, 15; 178/5.6, 5.1

[56] References Cited

UNITED STATES PATENTS

| | | | |
|---|---|---|---|
| 2,278,779 | 4/1942 | Hansell | 325/47 |
| 3,383,597 | 5/1968 | Battail et al. | 325/155 |
| 2,086,918 | 7/1937 | Luck | 325/47 |
| 2,448,055 | 8/1948 | Silver et al. | 325/35 X |
| 2,479,947 | 8/1949 | Lord | 178/5.6 |
| 3,277,373 | 10/1966 | Allen | 325/4 |

FOREIGN PATENTS

| | | | |
|---|---|---|---|
| 200,489 | 3/1955 | Australia | 325/5 |

*Primary Examiner*—Robert L. Richardson
*Attorney*—Edward J. Norton

ABSTRACT: A communications system for use in a frequency band having a restricted spectral power flux density uses a transmitter having a specified carrier frequency within the band. A linear sawtooth generator's output is summed together with an information bearing signal in a linear adding amplifier to produce a composite signal. The composite signal is then used to frequency modulate a carrier frequency oscillator whose energy is caused to spread out over the frequency band such that the amount of energy in each of a group of slots within the frequency band is within permitted limits. The spacing of the slots is determined by the sawtooth generator's repetition rate.

INVENTORS
JAMES J. HANLEY &
FRANCIS H. TAYLOR
BY Edward J. Norton
ATTORNEY

INVENTORS
JAMES J. HAWLEY &
FRANCIS H. TAYLOR
BY Edward J Norton
ATTORNEY

FREQUENCY MODULATION SYSTEM FOR SPREADING RADIATED POWER

Satellites are playing a role of ever-increasing importance in communications systems. Such satellites as Relay and Early Bird have already achieved wide spread use in the transmission of television pictures and information to ground stations located on various points of the earth. The future will find a greater and greater use of satellites as a means for conveying information throughout the world.

Presently, the 3.7 to 4.2 GHz. frequency band has been allocated by international agreement for satellite to earth transmission. Since this band is shared with surface microwave systems, limitations on the power flux density emitted by a satellite have been imposed to protect surface systems from interference by satellite transmissions. In any case whenever a band of frequencies is used by both satellite and ground systems, there may be limitations on spectral power flux density. The International Radio Consultive Committee (CCIR) recommendation has specifically stated that for certain forms of modulation the spectral power flux density will not exceed $-152\ dbw/m^2/4$ kHz. in the 3.7 to 4.2 GHz. band for example. Hence, in order to meet this spectral flux density limitation and in order to keep the ground receiving equipment simple, there has to be a system which allows the satellite to transmit a sufficient amount of power or effective radiated power while still operating within the allowable spectral flux density limitation.

It is an object of this invention to provide a transmitter allowing an increased effective radiated power.

Another object is to provide a satellite transmitter capable of high power operation with relatively low spectral power flux density.

It is still another object to provide an improved communications system using a satellite.

In accordance with one embodiment of the invention, a communications satellite operating in the 3.7 to 4 GHz. band is provided with a transmitting antenna which is coupled by conventional means to a satellite transmitter. The information to be transmitted is combined with a linear sawtooth having a fixed repetition frequency in a linear adder circuit. The output of the adder circuit is a composite signal containing the sawtooth wave shape on which is impressed the information-containing signal. The output of the linear adder is then coupled to one terminal of a frequency modulator. Another input into the frequency modulator is derived from a carrier oscillator operating in the above-mentioned frequency band. The frequency modulator spreads out the energy of the carrier oscillator in accordance with the sawtooth voltage and further modulates the carrier oscillator's frequency in accordance with the information containing signal. The total energy from the carrier in this manner is distributed in frequency slots within the 3.7 to 4.2 GHz. frequency band or other band. The frequency separation is a function of the repetition frequency of the sawtooth. In this manner the satellite can radiate higher power and still stay within the recommended spectral power flux density. This allows simpler ground stations because of the higher power capability of the satellite.

These and other objects of the present invention will become clear as reference is made to the following specifications and drawings in which FIG. 1 is a pictorial view of a satellite communications system.

Figures 1, 2:
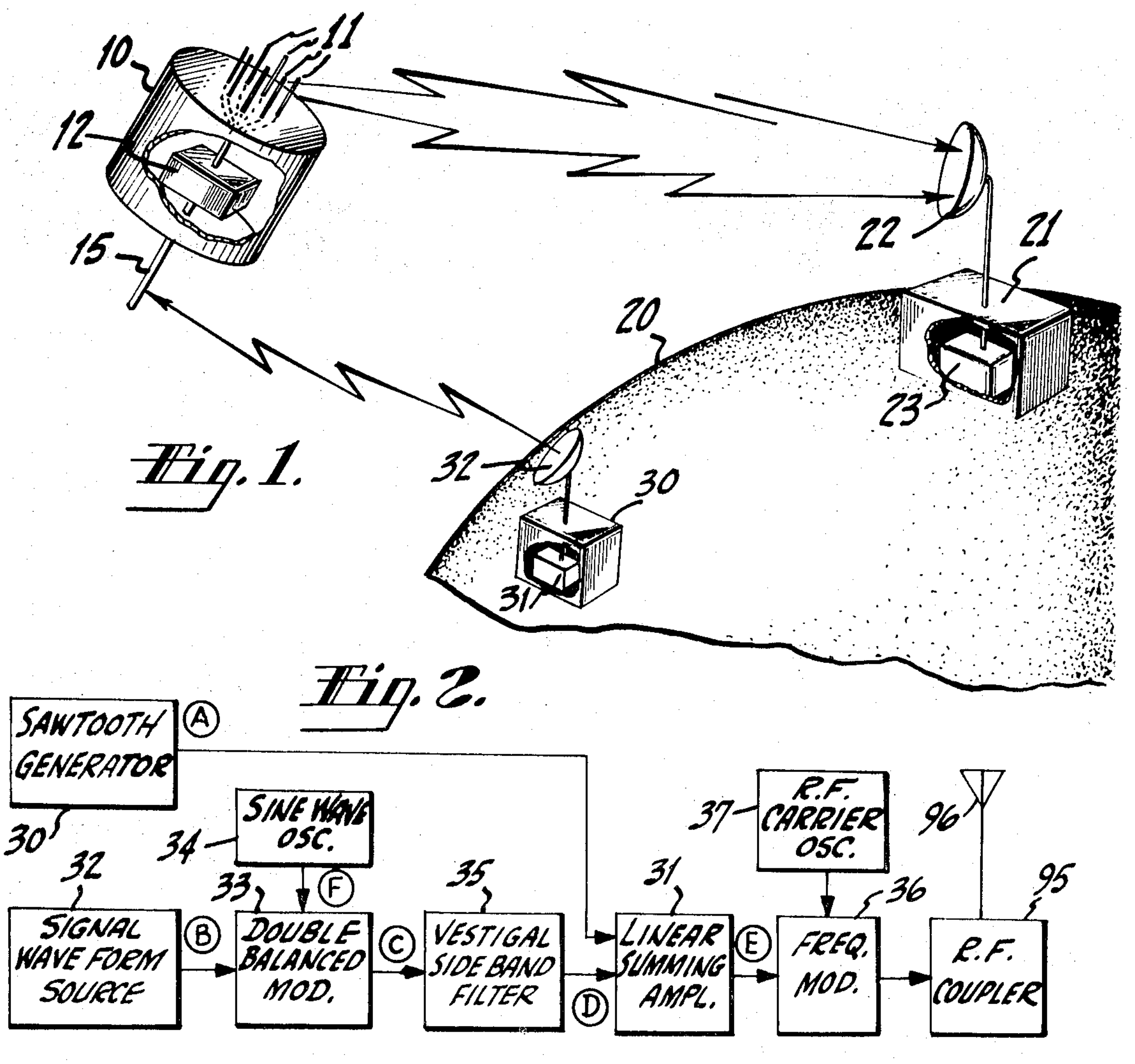
FIG. 2 is a block diagram of a transmitter according to the principles of this invention.

If reference is made to FIG. 1, there is shown a satellite 10 in orbit. The satellite may be in a synchronous orbit about the earth in which case it would hover continuously about one point on the earth. There is shown aboard satellite 10 a block designated as 12 which block contains a satellite receiver and transmitting equipment pertinent to this invention and more fully described in conjunction with subsequent figures. Also shown coupled to the satellite 10 is a series of transmitting antenna elements designated as 11. These antenna elements 11 may be coupled together to the output of transmitter 12 to form a phased array or a retrodirective antenna. In any case whether there be a plurality of elements 11 or a single antenna element, it should have the capability of directing a fairly narrow beam of energy on a point located at the surface of the earth 20. Shown located at the surface of the earth 20 is a ground station 21 which has a receiving antenna 22 coupled to a receiver 23. The receiving antenna 22 may be a parabolic dish or some other conventional antenna used for responding to signals transmitted by satellites as 10. Coupled to the antenna 22 is a receiver 23 which will be more fully described in conjunction with FIG. 4.

Also shown on the surface of the earth 20 is another ground station designated as 30. Ground station 30 may be a television studio or a constituent of a communications link. If ground station 30 were a television studio it would be desired to transmit the television signals generated in the studio to the satellite 10 for further conveyance to the remote ground station 21. This of course comprises a satellite communications link where the satellite 10 is used as a repeater. As can be seen from FIG. 1, the transmitter 31 located at ground station 30 is coupled to an antenna 32 which antenna may be a parabolic dish or some other suitable transmitting device capable of sending a signal to the satellite 10. Shown mounted with the satellite 10 is a receiving antenna element 15 which serves to respond to the signal transmitted from ground station 30 via the transmitting antenna 32. The satellite 10 has a receiver 12 coupled to the receiving antenna 15 for the reception of this signal. As previously mentioned if the satellite 10 is to operate in a power-restrictive frequency band it then becomes necessary to alter the output of the satellite's transmitter 12 in a manner to achieve the allowable flux density from the satellite 10 so as to avoid interference with communication system on the ground. This alteration can be accomplished aboard the satellite 10 or directly at the ground station 30 depending on the system.

If reference is now made to FIG. 2, there is shown a transmitter which could be used at the ground station 30 for transmitter 31. Before proceeding with the explanation of the particular embodiment, a brief introduction to the basic system of operation is warranted. The power spectrum of a frequency-modulated carrier is determined by the nature of the modulating waveform. At one extreme is the direct current or DC modulating waveform which produces an output power spectrum containing a single frequency component. At the other end is a sawtooth modulating waveform which produces a spectrum whose components are equally spaced, where the spacing is equal to the repetition rate of the sawtooth, and which components are nearly equal in magnitude. When using frequency modulation in a satellite transmitter, in for instance the 3.7 to 4.2 GHz. band, it is desirable to have a relatively uniform power spectral density across the allocated bandwidth. In this manner the total radiated power can be maximized for a given permissive level of interferences and hence, allow the use of simpler ground or receiving stations. Therefore one would like to make the power spectral density of a frequency or phase modulated carrier relatively uniform in the allocated bandwidth. As a specific example the embodiments are applied to the case of a carrier in the 3.7 to 4.2 GHz. common carrier band which is frequency modulated by a television signal using U.S. Television standards. The use of this technique allows the effective radiated power of the satellite carrier to be received by relatively simple ground stations and at the same time prevents the spectral flux density from exceeding the levels which would interfere with point-to-point microwave stations operating in the same band on earth.

FIG. 2 shows a transmitter which may be employed in either a satellite or a ground station as will be explained later. There is shown a sawtooth generator 30 whose output is coupled to one input of a linear summing amplifier 31. There is shown a signal waveform source 32 whose output is coupled to one input of a double balanced modulator 33. The other input of the double balanced modulator 33 is coupled to a sine wave oscillator 34. The output of the double balanced modulator 33 is coupled to the input terminal of a vestigal side band filter 35 whose output is coupled to another input of the linear summing amplifier 31. The output of the linear summing amplifier 31 is coupled to an input of a frequency modulator 36 whose other terminal is coupled to a radio frequency or RF carrier oscillator 37. The output of the frequency modulator 36 is then coupled to a transmitting antenna 96 via an RF coupler 95. The operation of the circuit is as follows. A sawtooth waveform is generated by the sawtooth generator 30. There are many techniques shown in the prior art for the generation of sawtooth waveforms and any one of such generators could be used in this invention. The important factor being that the sawtooth waveform is a highly efficient means to spread power. By modification of a waveform in the time domain it is possible to effect a change in the frequency spectral content of the signal. In particular by modifying a signal waveform before it modulates a carrier it is possible to prevent all power in the modulated carrier from appearing at one or a few discrete frequencies. A carrier frequency modulated by a DC voltage level has all of its power at one frequency.

The output of the signal waveform source 32 contains an information-bearing signal which may be video or voice or some other suitable message to be repeated by the satellite via its transmitter. The output of the signal waveform source 32 is coupled to one input of a double balanced modulator 33 which modulator as implied by its name produces an output which consists only of the upper and lower side bands while completely suppressing the modulating waveform and the carrier frequency. A suitable carrier frequency is obtained from the sine wave oscillator 34 shown coupled to the other input of the double balanced modulator 33. The purpose of the sine wave oscillator and the double balanced modulator is to discriminate, from the sawtooth, frequencies within the signal waveform derived from the source 32 in the region from DC to 10 or more times the repetition rate of the sawtooth. The purpose then of the double balanced modulator 33 and sine wave oscillator 34 is to shift the spectrum of the signal waveform up in frequency so that the resultant spectrum no longer overlaps the sawtooth spectrum. This technique allows the easy separation of the two spectra by a simple filtering technique at a ground receiver such as 21 of FIG. 1. The vestigal side band filter 35 filters and passes one side band and a portion of the other side band and couples them to a corresponding input of the linear summing amplifier 31. The side bands obtained from the side band filter 35 contain all the modulation components present in the original signal and hence contain all the information that the original signal contained. The outputs of the sawtooth generator 30 and the side band filter 35 are arithmetically added in the linear summing amplifier 31. The linear summing amplifier 31 may be an operational amplifier with two input resistors which gives one an output directly proportional to the sum of the signals at both inputs. Techniques for adding two signals are known in the art and not considered part of this invention.

The output of the linear summing amplifier 31 is then coupled to one terminal of a frequency modulator 36 which also has coupled to its other terminal an RF carrier oscillator 37. The function of the frequency modulator 36 is to modulate the carrier in accordance with the composite signal consisting of the sum of the sawtooth and side bands of the signal waveform. The resultant output is a frequency modulated signal consisting of RF energy located in a series of slots over the desired earth to spacecraft transmission band. Moreover each 4 kHz. slot in the 3.7 to 4.2 GHz. band contains a predetermined amount of power so that no slot has more power than specified by CCIR recommendations. The output of the frequency modulator 36 is coupled to a RF coupler 95 which in turn is coupled to a transmitting antenna 96 which may be the antenna 32 of FIG. 1.

The transmitter described above could be located in the ground station 30 of FIG. 1 for transmitter 31. In this case the spacecraft 10 would be either an active or passive repeater. In the case of a passive repeater the ground station 30 would transmit the power spread spectrum to the spacecraft 10 and the spacecraft would redirect this energy to a desired location on earth. If the spacecraft 10 were active, the ground station 30 might transmit to it in the 6.0 to 6.4 GHz. band, which band is also shared by ground microwave systems and also subject to CCIR recommendations. The spacecraft 10 would then perform a frequency translation. The signals received from the ground station at 6.0–6.4 GHz. would be previously spread out as indicated above at the ground station, they would then be translated by a down conversion process in the spacecraft to the 3.7–4.2 GHz. band and be transmitted in a desired direction by the spacecraft. The spectral distribution in this case would be the same as that in 6.0–6.4 GHz. band due to the action of the transmitter of FIG. 2 located at the ground station.

If reference is now made to FIGS. 3A –3D there are shown four graphs of the frequency spectrum present at the various points of FIG. 2.

Figures 3A, 3B, 3C, 3D:
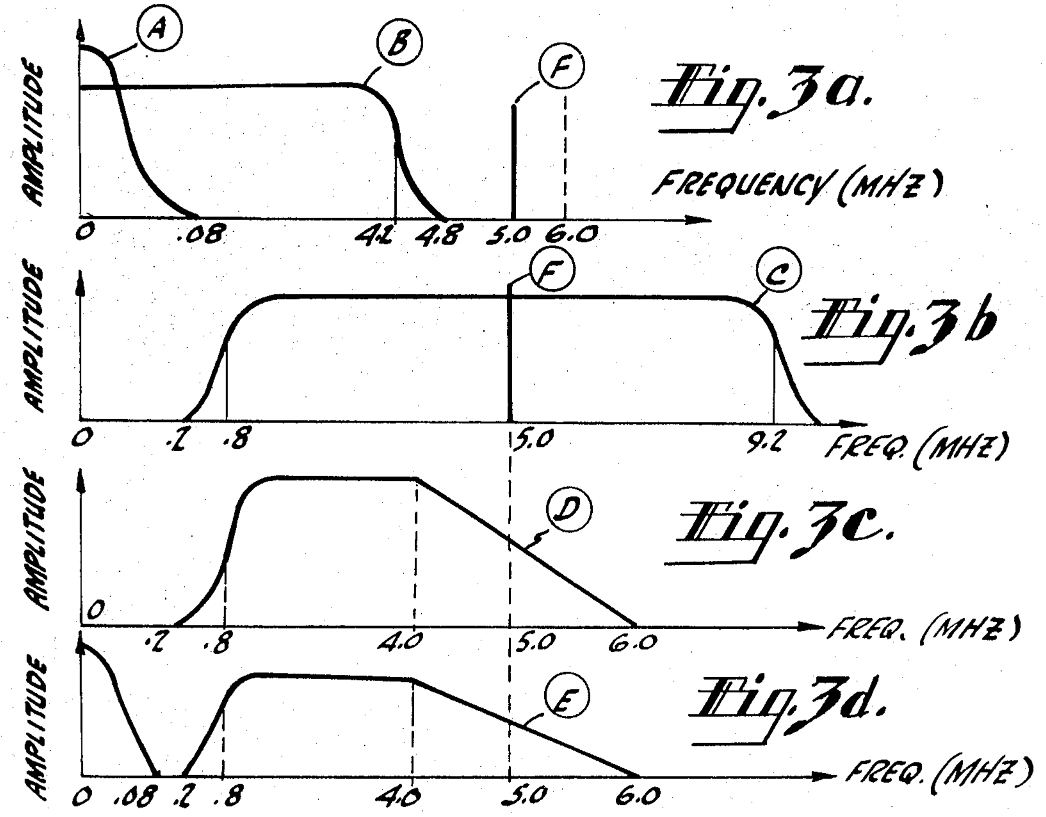
FIGS. 3A-3D show a series of graphs of amplitude versus frequency used in explaining the principles of operation of this invention.

If reference is made to FIG. 3A there is shown a plot of the sawtooth's spectrum referenced as Ⓐ which corresponds to the spectrum present at the output of the sawtooth generator 30 of FIG. 2 which output is also referenced as Ⓐ. According to CCIR requirements it is necessary to assure that the power in any 4 kHz. slot received at the earth's surface from a satellite be limited. To meet this requirement a 4 kHz. sawtooth repetition rate is used. The frequency spectrum of the sawtooth possesses all harmonic components of its repetition rate, their individual amplitudes are inversely proportional to their harmonic frequency. For all practical purpose harmonics beyond the twentieth are neglected. The horizontal axis shown in FIG. 3A is labeled MHz. or megacycles and the envelope of the 4 kHz. sawtooth is seen to approach zero amplitude at about 0.08 MHz. or 80 kHz. Superimposed on the envelope of the sawtooth's spectrum Ⓐ is the envelope of the signal spectrum Ⓑ which appears at the output Ⓑ of the signal waveform source 32 of FIG. 2. The bandwidth of the signal is shown to be approximately of the order of 4.2 MHz. which point is the half amplitude point of a typical video spectrum Ⓑ. Also shown on the graph is a line Ⓕ which is the spectrum of sinewave oscillator 34 shown in FIG. 2. This is chosen to be at 5 MHz. to assure separation of the video spectrum Ⓑ from the sawtooth spectrum Ⓐ. Graph 3B shows the resultant shift in the signal waveform spectrum Ⓑ due to the action of the sinewave oscillator spectrum Ⓕ operating on the signal spectrum via the modulator 33 of FIG. 2. The modulator output spectrum C then has a bandwidth of approximately 8.4 MHz. taken at the half amplitude points. It is of course apparent that the sinewave oscillator's spectrum Ⓕ could have been at 6 MHz. further shifting the spectrum of the signal from 1.8 MHz. at half amplitude points allowing easier filtering. The graph of FIG. 3*c* represents the resultant output spectrum Ⓓ after the spectrum of FIG. 3B has been passed through the vestigal sideband filter 35 of FIG.2. Curve Ⓓ is the spectrum at the output of the filter 35.

If reference is made to FIG. 3D there is shown the composite signal spectrum Ⓔ which appears at the output of the linear summing amplifier 31 of FIG. 2. This composite spectrum represents the spectrum of the sawtooth and the spectrum of the shifted information signal; this composite signal is used to frequency modulate the final RF carrier oscillator for transmission and power spreading in the 6.0–6.4 or 3.7–4.2 GHz. band. Using the composite signal to modulate the carrier allows one to transmit the desired information because the RF carrier is modulated with that portion of the composite signal containing the video. The presence of the sawtooth in the composite signal serves to spread the power through the band in adjacent 4 kHz. slots which slots are determined by the repetition rate of the sawtooth. Thus thereby assuring that the spectral power in any one of these slots does not exceed the specified maximum value for the frequency band of interest.

Figure 4:
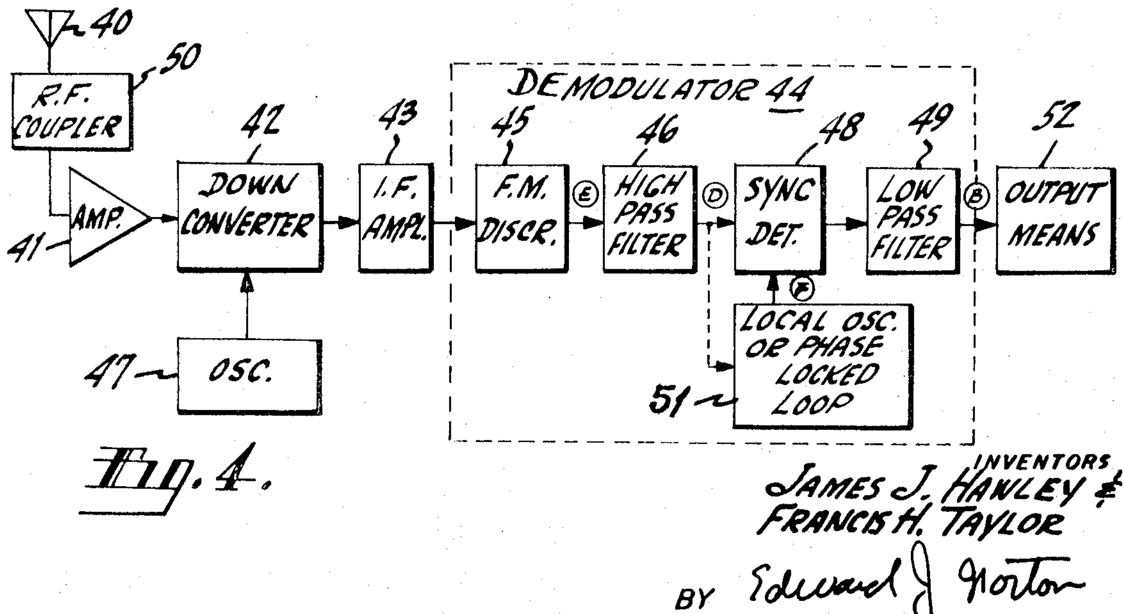
FIG. 4 is a partial schematic and block diagram of a receiver according to the principles of this invention.

If reference is made to FIG. 4 there is shown a receiver which could be used at ground station 21 in FIG. 1 to receive the signal from the satellite 10. Numeral 40 references the ground station antenna which may be parabolic or some other suitable configuration, to enable reception of the satellite's transmitted signal. The received signal is coupled through an RF coupler 50 to a low noise amplifier 41 which may be a maser, parametric amplifier and so on. The amplifier 41 amplifies the received signal to a level compatible with the requirements of the down converter circuit 42. Down converter 42 may be of the parametric type and where this is used it could serve to directly couple to the antenna 40 eliminating the amplifier 41. The down converter 42 has one input coupled to amplifier 41 and its other input coupled to an oscillator 47. Oscillator 47 serves to "pump" the down converter 42 such that the down converter produces an output sideband which is the frequency difference between the received signal frequency band and the osicllator's frequency. The output of the down converter 42 is at a suitable intermediate frequency (IF). The signal is amplified by the IF amplifier 43 and demodulated by the demodulator 44. The demodulator 44 performs the inverse function of the block diagram of FIG. 2.

FIG. 4 shows the operation of the demodulator 44. The IF signal is frequency demodulated by the FM discriminator 45. The high pass filter 46 blocks the sawtooth waveform while passing the video signal on its 5 MHz. subcarrier, for example, to one input of the synchronous detector 48. The synchronous detector 48 has another input from the local oscillator 51. This oscillator may be a stable 5 MHz. crystal oscillator or it may be a phase locked loop which uses the 5 MHz. portion of the output signal from the high pass filter 46. The synchronous detector 48 may be a circuit identical to the double balanced modulator 33 of FIG. 2, which circuits are known in the art. The low pass filter 49 removes noise and spurious signals from the video baseband produced by the synchronous detector 48. The video baseband is provided to an output means 52 which may be a land microwave system or a TV broadcasting transmitter or a screen for viewing the programs. Referring to FIG. 3, the spectrum (E) is at the output of discriminator 45, the spectrum (D) is at the output of the high pass filter 46, the spectrum (F) is at the output of the local oscillator 51, and the spectrum (B) is at the output of the low pass filter 49.

Figures 5, 6:
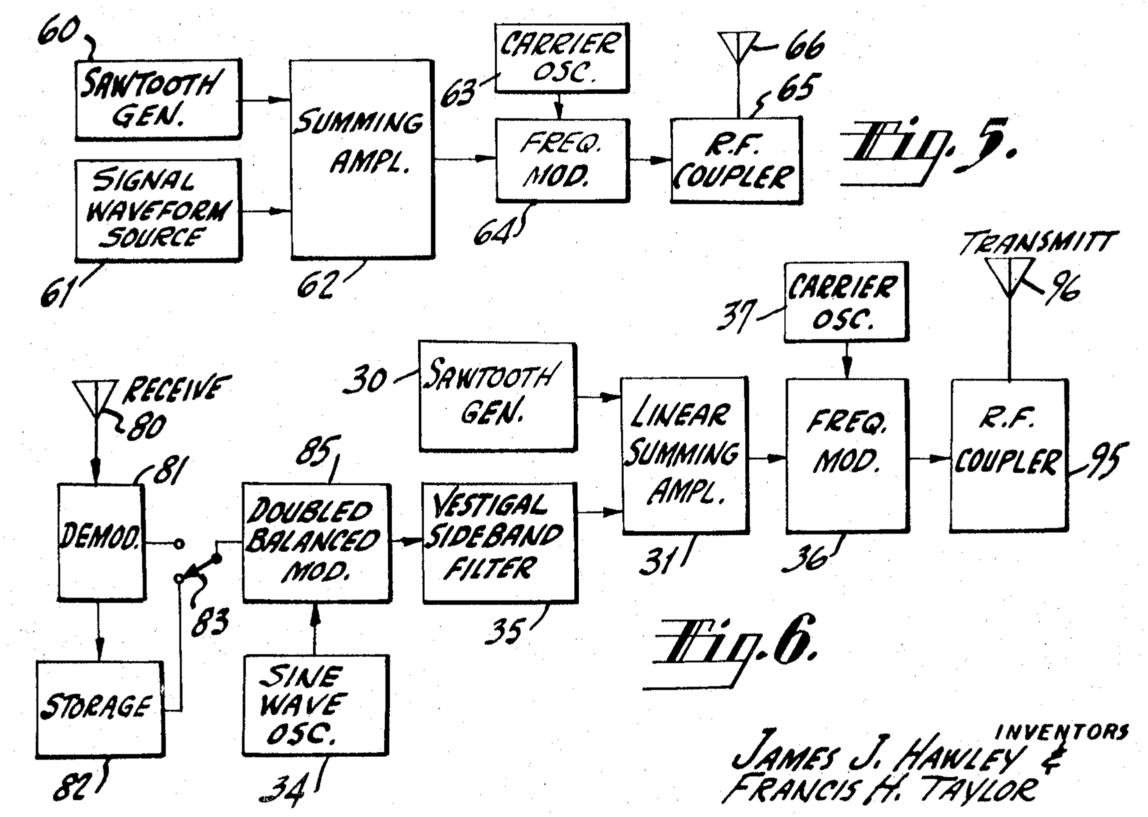
FIG. 5 is a partial schematic and block diagram of another transmitter according to this invention.
FIG. 6 is a partial schematic and block diagram of a satellite transmitter according to this invention.

Referring to FIG. 5 there is shown a transmitter which may be employed either aboard a spacecraft 10 or in the transmitting station 31 of FIG. 1 when it is desired to obtain a greater effective radiated power from the spacecraft and when the signal waveform possesses a bandwidth where there is no overlap of frequency spectrum with that of the sawtooth.

In the case of the transmitting station 31 of FIG. 1 the output of a signal waveform source 61, which may be a television camera or a receiver is coupled to one terminal of a summing amplifier 62 which functions in the manner as described in conjunction with the linear summing amplifier 31 in FIG. 2. The other input of the adder 62 is coupled to the output of a sawtooth generator 60, which produces a sawtooth having a repetition frequency equal to the desired energy slot separation. The sawtooth generator 60 may also be a triangular waveform generator which produces a triangular waveshape that differs from the sawtooth in that it is defined by an increasing amplitude from zero with a positive slope and then an equal and opposite slope or negative slope back to zero. The sawtooth increases in amplitude from zero with a positive slope and then when reaching a specified amplitude returns quickly back to zero.

The summing amplifier 62 then produces a composite signal which is the sum of the output of the sawtooth generator 60 and the signal waveform source 61, which composite signal serves to modulate the output of a carrier oscillator 63 through the action of the frequency modulator 64. The output of the modulator 64 may then be transmitted to the spacecraft via an antenna element 66 or a plurality of elements which may couple to the modulator 64 through an RF coupler 65 or some other suitable matching device. The spacecraft would receive the transmission, translate it to a new band and transmit it to the receiving stations.

FIG. 6 shows a transmitter which might be employed aboard the spacecraft 10 to perform power spreading and transmission from the spacecraft. There is shown a receive antenna 80 which would correspond to 15 of FIG. 1. The spacecraft would receive signals from a ground station, these signals are then received by antenna 80 and coupled to a demodulator 81, which demodulates them into video or some other information-bearing signal. Also shown coupled to an output of the demodulator 81 is a storage circuit 82, which circuit may be activated by the demodulator 81 upon the reception of a tone or suitable frequency from the ground. The reception of the tone activates the storage circuit 82 which may be a video or other type recorder and serves to record and store the information received from the ground station. The demodulator is also shown coupled to a switch 83 which switch is also activated by the demodulator 81 to allow the output from either the demodulator 81 or the storage circuit 82 to be fed to the double balanced modulator 85. In this manner a television program or some other signal may be stored and played back or transmitted within CCIR recommendations at a later time under the action of a ground station command. Alternatively the signal may be transmitted directly by coupling the output of the demodulator 81 directly to the double balanced modulator 85 via switch 83. The other blocks in FIG. 6 perform the identical functions as their counterparts in FIG. 2 and hence the same numeral designation was retained as the same description of operation applies. The major difference is that the diagram of FIG. 6 is specifically directed towards an embodiment of a transmitter as it might appear aboard a spacecraft.

What is claimed is:

1. The method of spreading the radiated power of a transmitter over a band of frequencies comprising the steps of,
   a. generating a waveshape having a linear amplitude versus time characteristic and a fixed repetition rate chosen to provide a spectrum which is essentially entirely within a first frequency band,
   b. adding said waveshape to an intelligence-bearing signal, said intelligence-bearing signal being wholly situated within a second frequency band which is entirely above the first frequency band, to produce a composite signal,
   c. generating a carrier wave at a specified frequency and
   d. modulating said carrier wave with said composite signal causing the energy of said carrier wave to spread according to said fixed repetition rate.

2. The method of spreading the radiated power of a transmitter over a band of frequencies comprising the steps of,
   a. generating an intelligence-bearing signal, encompassing a first frequency band,
   b. generating a fixed frequency signal,
   c. modulating said intelligence-bearing signal with said fixed frequency signal to produce an intelligence-bearing signal at a second frequency band,
   d. generating a waveshape having a linear amplitude versus time characteristic and a fixed repetition rate chosen to provide a spectrum which is essentially entirely below said entire second frequency band,
   e. adding said waveshape with signal at said second frequency band to produce a composite signal,
   f. generating a carrier wave at a specified frequency and,
   g. modulating said carrier wave with said composite signal to cause the energy of said carrier wave to spread according to said fixed repetition rate.

3. Apparatus for spreading the power radiated from a transmitter over a frequency band comprising a. first means for providing a first band of signal frequencies,
b. second means for generating a sawtooth signal having a specified repetition rate chosen to provide a spectrum which is essentially entirely below said entire first band of signal frequencies,
c. third means coupled to said first means and said second means for providing a composite signal which signal is the sum of said first band of signal frequencies and said sawtooth signal, and
d. means coupled to said third means to modulate a carrier in accordance with said composite signal to distribute said carrier's energy in a second band of frequencies with each one of said last-mentioned frequencies separated from another by a factor of said sawtooth's repetition rate.

4. Apparatus for spreading the power radiated from a transmitter operating at a frequency range in which the amount of power is restricted to a specified value in a series of adjacent frequency slots representing said frequency range, comprising,
a. a source providing a first band of input signal frequencies containing information to be transmitted,
b. modulating means coupled to said source to shift said first band of input signal frequencies to a second higher band of frequencies,
c. sawtooth generating means for generating a sawtooth wave having a repetition frequency which is a function of said spacing of said frequency slots and which repetition frequency is chosen to provide a spectrum which is essentially entirely below said entire second band frequency,
d. means coupled to said modulating means and said sawtooth generating means for providing a composite signal of said sawtooth wave and said second band of frequencies,
e. a carrier frequency oscillator, and
f. means for frequency modulating said carrier frequency oscillator in response to said composite signal to provide the specified value of power in each of said frequency slots.

5. Apparatus for spreading the radiated power over a frequency band from a transmitter operating at a specified carrier frequency, comprising,
a. a source providing a first band of input signal frequencies,
b. first means coupled to said source to shift said first band of input signal frequencies to another band of frequencies,
c. second means for generating a linear sawtooth having a specified repetition rate chosen to provide a spectrum which is essentially entirely below said entire other band of frequencies,
d. third means coupled to said first means and second means to provide a composite signal from said other band of frequencies and said linear sawtooth,
e. an oscillator at said specified carrier frequency, and
f. means coupled to said oscillator and said third means to substantially equally distribute said carrier frequency energy in frequency slots spaced by said sawtooth's repetition rate.

6. In combination
a. a spacecraft,
b. a directive antenna mounted on said spacecraft and oriented to transmit energy in a given direction,
c. first means coupled to said antenna to provide an energizing carrier frequency thereto,
d. receiving means coupled to said spacecraft to provide a first band of signal frequencies,
e. a sawtooth generator for producing a sawtooth signal having a specified repetition rate chosen to provide a spectrum which is essentially entirely below said entire first band of frequency,
f. summing means coupled to said receiving means and said sawtooth generator to produce a composite signal which is proportional to the sum of said first band of signal frequencies and said sawtooth signal, and
g. modulating means coupled to said first means and said third means to vary said carrier frequency's energy in accordance with said composite signal to spread said carrier frequency over a second band of frequencies spaced at intervals determined by said sawtooth's repetition rate.

7. In a communication system for communication between an unmanned, orbiting spacecraft and a ground station remote therefrom, the improvement in the ground station comprising
a. a source of intelligence-bearing signal located at said ground station, said intelligence-bearing signal being wholly within a given frequency band,
b. a sawtooth generator at said ground station for producing a sawtooth having a specified repetition rate chosen to provide a spectrum which is essentially entirely below said entire given frequency band,
c. a linear adder coupled to said intelligence-bearing signal source and said sawtooth generator to provide a composite signal,
d. a source of carrier frequency,
e. first means coupled to said carrier source and said linear adder to modulate said carrier frequency's energy in accordance with said composite signal to spread out said carrier frequency's energy over a band of frequencies spaced at intervals determined by said sawtooth's repetition rate,
f. a directive antenna located at said remote station and directed to transmit to said spacecraft, and
g. further means to couple said first means to said directive antenna to cause said antenna to radiate said carrier's spreaded energy in the direction of said spacecraft.

* * * * *